Patented Oct. 19, 1937

2,096,566

UNITED STATES PATENT OFFICE 2,096,566

COMPOUND AND PROCESS FOR MAKING SAME

Claude R. Smith, Washington, D. C., dedicated to the free use of the Public in the United States No Drawing. Application December 27, 1933, Serial No. 704,146

3 Claims. (Cl. 167—34)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the Public in the territory of the United States of America to take effect upon the granting of a patent to me.

This invention relates to the reaction of nicotine either as a free base or in its salt forms with bentonite in the presence of water, resulting in compound formation in which replaceable inorganic bases of the bentonite are substituted by nicotine. These compounds can be made to vary in nicotine content from minute proportions up to approximately 10 percent or more of nicotine.

It has long been known that fuller's earth has the capacity to remove common alkaloids from aqueous solutions under specified conditions. This reaction has been universally referred to as adsorption. It has been generally assumed that an alkaloidal salt such as for example nicotine sulphate was removed from solution as such although mention has been made of finding some of the calcium of the earth combined with the acid of the nicotine salt.

Bentonite is an alumino-silicate of volcanic origin and is considered in the arts as distinct from fuller's earth. I have found that several bentonite samples which were represented to me as coming from various sections of this country have proven efficient in their ability to combine with nicotine and its salts. Fuller's earth has usually very slight reacting power unless obtained from certain selected deposits. Bentonite compounds with nicotine are dispersed in water to a much greater extent than compounds of fuller's earth and are accordingly more suitable for insecticidal purposes for which great dispersion is usually desired.

I have found the reaction of nicotine salts with bentonite to be one of base exchange in which the nicotine substitutes for the inorganic bases of the bentonite. The acid with which the nicotine is originally combined remains entirely in the water combined with inorganic bases and with some excess nicotine. The reaction is essentially one of double decomposition. Bentonite reacts with free nicotine but very much less is removed from the water. In solutions to which an inorganic base has been added a lesser quantity combined decreasing rapidly as the inorganic base is increased.

The reaction of bentonite with nicotine may be expressed as follows:

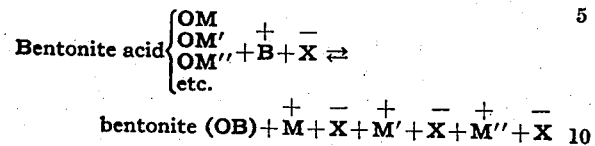

$$\text{bentonite (OB)} + \overset{+}{M} + \overset{-}{X} + \overset{+}{M'} + \overset{-}{X} + \overset{+}{M''} + \overset{-}{X}$$

where M, M' and M'' represent replaceable bases such as calcium, sodium, magnesium, etc., and B represents the cation of nicotine and X the anion of the acid from the nicotine salt.

This equation is employed to convey the cationic nature of the base exchange with little or no influence exerted by the anions. The dircet reaction is favored by the insolubility of the nicotine-bentonite compound and the ionization of the nicotine salt. The reverse reaction is caused by the cations of the dissolved salts. If inorganic salts are added in excess of those formed the effect is to diminish the percentage of combined nicotine.

The following examples serve to illustrate the methods employed in forming nicotine-bentonite compounds:

*Example 1.*—Fifty grams of bentonite is brought into intimate contact with 2.5 grams of nicotine, previously neutralized with some acid such as hydrochloric acid, and contained in two liters of water. The nicotine enters into combination with the bentonite displacing inorganic cations. In one sample of bentonite 88 percent of the nicotine was found combined. The nicotine-bentonite may be removed by suitable means after washing with the solvent to remove soluble impurities and dried.

*Example 2.*—Fifty grams of bentonite is brought into intimate contact with 2.5 grams of nicotine, previously neutralized with an acid together with additional acid just sufficient to neutralize the natural alkalinity of the bentonite, and contained in 2 liters of water. The bentonite now combined with 95 percent of the nicotine.

*Example 3.*—Fifty grams of bentonite is brought into intimate contact with 5 grams of nicotine, previously neutralized with acid together with additional acid sufficient to neutralize the natural alkalinity of the bentonite, contained in 2 liters of water. The bentonite becomes quite flocculent. It is filtered and washed with a solution containing about 3 grams of nicotine neutralized with acid. This washing may be followed by an additional wash containing, say 1 gram of neutralized nicotine, and then with pure water. A bentonite compound is obtained which is saturated with nicotine and may contain as high as 10 percent or more of nicotine.

Example 4.—Fifty grams of bentonite is treated with 2.5 grams of free nicotine contained in 2 liters of water. Only about 50 percent of the nicotine combines under these conditions. The mixture is not flocculent and is filtered with difficulty.

This invention is particularly concerned with the procedures necessary to effect the combination of bentonite with nicotine. It is understood that filtration, washing with water, and drying to prepare the compounds in suitable form may be employed when desired.

Having fully disclosed my discovery, I claim as my invention:

1. The method of preparing nicotine-bentonite compounds adapted for use as a stomach insecticide which comprises bringing together bentonite and nicotine in the presence of water with the addition of acid preferably in an amount sufficient to neutralize the base and the natural alkalinity of the bentonite.

2. The method of preparing nicotine-bentonite compounds adapted for use as a stomach insecticide which comprises bringing together bentonite and nicotine in the presence of water with the addition of acid preferably in an amount sufficient to neutralize the base and the natural alkalinity of the bentonite followed by washing with the salt of the organic base.

3. A stomach poison for insects comprising an aqueous suspension of the reaction product of neutralized nicotine and neutralized bentonite.

CLAUDE R. SMITH.